(12) United States Patent
Schoenbrunn et al.

(10) Patent No.: US 6,966,985 B2
(45) Date of Patent: Nov. 22, 2005

(54) SELF-DILUTING FEEDWELL INCLUDING A VERTICAL EDUCATION MECHANISM

(75) Inventors: Frederick R. Schoenbrunn, Salt Lake City, UT (US); Stephen Hughes, Wamberal (AU); Kurt R. Dahl, Avoca Beach (AU)

(73) Assignee: GL&V Management Hungary KFT, Egressy (HU)

( * ) Notice: Subject to any disclaimer, the term of this patent is extended or adjusted under 35 U.S.C. 154(b) by 0 days.

(21) Appl. No.: 10/382,096

(22) Filed: Mar. 5, 2003

(65) Prior Publication Data
US 2003/0173289 A1 Sep. 18, 2003

Related U.S. Application Data
(60) Provisional application No. 60/361,985, filed on Mar. 5, 2002.

(51) Int. Cl.[7] ................................................. B01D 21/01
(52) U.S. Cl. ..................... 210/195.1; 210/199; 210/207; 210/519; 210/528
(58) Field of Search ................................. 210/194, 199, 210/205, 207, 209, 519, 523, 528, 195.1

(56) References Cited

U.S. PATENT DOCUMENTS

| | | | |
|---|---|---|---|
| 1,344,370 A | 6/1920 | Allen | |
| 1,452,016 A | 4/1923 | Allen | |
| 1,472,317 A | 10/1923 | Allen | |
| 2,322,087 A | 6/1943 | Atwood | |

(Continued)

FOREIGN PATENT DOCUMENTS

| | | |
|---|---|---|
| AU | 622238 | 5/1990 |
| DE | 1517647 | 4/1969 |
| GB | 798983 | 7/1958 |

*Primary Examiner*—Peter A. Hruskoci
(74) *Attorney, Agent, or Firm*—TraskBritt (57) ABSTRACT

An apparatus and method of diluting a solid particle-containing slurry in conjunction with a sedimentation process. A slurry is introduced into the launder portion of a feedwell and flowed vertically downward through an eductor nozzle having its exit location placed below the liquid level of a volume of clarified liquor. The eductor nozzle is positioned adjacent a diluent inlet such that discharge of the slurry through the eductor nozzle creates a low pressure zone, drawing clarified liquor through the diluent inlet for mixing and dilution of the slurry. A flocculating reagent may additionally be introduced into the diluted slurry for producing a floc and expediting settling of the solid particles.

15 Claims, 5 Drawing Sheets

U.S. PATENT DOCUMENTS

| | | |
|---|---|---|
| 2,365,293 A | 12/1944 | Robinson |
| 2,528,094 A | 10/1950 | Walker |
| 2,577,797 A | 12/1951 | Moyer |
| 2,678,730 A | 5/1954 | Coulter |
| 2,961,099 A | 11/1960 | Lind |
| 2,961,100 A | 11/1960 | Katz |
| 3,136,724 A | 6/1964 | Lind |
| 3,228,530 A | 1/1966 | Quast |
| 3,395,800 A | 8/1968 | Kraus |
| 3,532,218 A | 10/1970 | Blottnitz |
| 3,534,861 A | 10/1970 | Hubbell |
| 3,770,131 A | 11/1973 | Davis |
| 3,891,557 A | 6/1975 | Edgerton |
| 3,926,805 A | 12/1975 | Walker |
| 3,994,808 A | 11/1976 | Kearney |
| 4,022,697 A | 5/1977 | Pankuch |
| 4,038,185 A | 7/1977 | Kline |
| 4,053,421 A | 10/1977 | Pentz |
| 4,054,514 A | 10/1977 | Oltmann |
| 4,055,494 A | 10/1977 | Emmett |
| 4,069,143 A | 1/1978 | Friesenborg |
| 4,097,026 A | 6/1978 | Haindl |
| 4,127,488 A | 11/1978 | Bell |
| 4,173,534 A | 11/1979 | Kelly |
| 4,199,452 A | 4/1980 | Mandt |
| 4,247,400 A | 1/1981 | King |
| 4,267,052 A | 5/1981 | Chang |
| 4,270,676 A | 6/1981 | Green |
| 4,272,369 A | 6/1981 | Love |
| 4,278,541 A | 7/1981 | Eis |
| 4,293,416 A | 10/1981 | Keoteklian |
| 4,300,919 A | 11/1981 | Lewis |
| 4,302,328 A | 11/1981 | Van Note |
| 4,303,517 A | 12/1981 | Love et al. |
| 4,351,733 A | 9/1982 | Salzer |
| 4,357,242 A | 11/1982 | Chandler |
| 4,364,834 A | 12/1982 | Wawro |
| 4,390,429 A | 6/1983 | Lejeune |
| 4,427,551 A | 1/1984 | Duveau |
| 4,541,850 A | 9/1985 | Oda |
| 4,545,892 A | 10/1985 | Cymbalisty |
| 4,555,340 A | 11/1985 | Boyle |
| 4,559,146 A | 12/1985 | Roets |
| 4,830,507 A | 5/1989 | Batatto |
| 4,859,346 A | 8/1989 | Wood |
| 4,869,814 A | 9/1989 | Hughes |
| 4,889,639 A | 12/1989 | Hudgin |
| 4,940,545 A | 7/1990 | DiGregorio |
| 4,999,115 A | 3/1991 | Peterson |
| 5,015,392 A | 5/1991 | Taylor |
| 5,147,556 A | 9/1992 | Taylor |
| 5,643,463 A | 7/1997 | Wood et al. |
| 5,716,519 A * | 2/1998 | Schleife et al. .............. 210/206 |
| 6,276,537 B1 * | 8/2001 | Esler et al. .................. 210/519 |

* cited by examiner

SELF-DILUTING FEEDWELL INCLUDING A VERTICAL EDUCATION MECHANISM

CROSS-REFERENCE TO RELATED APPLICATIONS

This application claims the benefit of U.S. Provisional Patent Application Ser. No. 60/361,985, filed Mar. 5, 2002, for SELF DILUTING FEEDWELL INCLUDING A VERTICAL EDUCTION MECHANISM AND METHOD OF DILUTION EMPLOYING SAME.

BACKGROUND OF THE INVENTION

Field of the Invention

1. The present invention relates generally to dilution of an influent slurry stream entering into a settling tank or basin and, more particularly, to a method and apparatus of effecting self-dilution of such slurry with improved control regarding the flow and flocculation of the slurry stream.

State of the Art

2. Various techniques may be used in the separation of suspended solid particles from the liquid in which they are suspended. These techniques may include, for example, flotation, filtration, centrifugation, expression and sedimentation.

Conventionally, the technique of sedimentation includes introducing a slurry (i.e., a liquid containing suspended solid particles) into a settling tank or basin of, for example, a clarifier or thickener, and allowing the suspended solid particles to settle by gravity to form a sludge or thickened mud on the bottom of the tank and a clarified liquor at the top of the tank. The sludge may then be collected and further processed or otherwise disposed of. Likewise, the supernatant liquid, also referred to as the clarified liquor, may be collected for further processing or disposal, or possibly reused to assist in a similar separation process.

In introducing the influent stream of slurry into the settling tank, it is desirable to control the flow of such a stream so as to avoid, or at least minimize, the disruption of the sludge formed along the bottom of the tank. Undue disruption of the sludge causes particles to become suspended within the supernatant liquid, once again resulting in an inefficient sedimentation process. In an effort to control the flow and distribution of the influent slurry, a feedwell may be positioned to receive the slurry as it is introduced into the settling tank. Conventionally, a feedwell includes an area or compartment within the settling tank but which is separated from the contents of the settling tank. The influent stream of slurry is then directed along a predetermined flow path to dissipate the kinetic energy associated with the flow of the influent stream of slurry. This is done so that the influent stream has reduced flow characteristics as it leaves the separated compartment and is intermixed with the contents of the settling tank. Furthermore, the feedwell may be configured to control the distribution of the influent stream into the settling tank such that the influent stream is not introduced at a single location within the settling tank. In essence, the feedwell reduces the velocity of the influent stream and provides increased distribution of the influent stream such that any associated turbulence, which would likely disrupt the sludge formed along the bottom of the settling tank, is reduced or eliminated.

In addition to controlling the flow and distribution of the influent stream of slurry, the feedwell may also be utilized for introducing a flocculating reagent into the influent stream. The addition of a flocculating reagent is sometimes used to expedite the sedimentation process. The flocculating reagent conventionally has a polymeric structure and acts to form a coagulated mass of the suspended particles, the mass sometimes being referred to as a floc. The floc exhibits an increased density over the suspended solid particles and thus provides an improved rate of settling.

While the use of a flocculating reagent may be beneficial in the sedimentation process, various factors may affect its efficiency. For example, it is important to thoroughly mix the flocculating reagent with the influent stream of slurry. Additionally, the concentration of suspended solid particles within the slurry must be taken into account. For example, if the concentration of suspended particles in the slurry is low, additional mixing may be required to ensure adequate interaction between the suspended particles and the flocculating reagent. On the other hand, if the concentration of suspended solid particles is high, the influent stream of slurry may need to be diluted in order to obtain a lower concentration level for optimum flocculation of the slurry to occur.

Various methods have been used in the past to dilute the influent stream of slurry. For example, diluent, which may include clarified liquor obtained in the same or a previous sedimentation process, may be pumped to the feedwell and mixed with the influent stream of slurry to obtain a desired level of concentration. However, use of a pump requires additional piping, valving and monitoring equipment as well as additional energy. Such equipment, with the attendant operation and maintenance thereof, adds to the expense of the sedimentation process.

An alternative method of diluting the influent stream of slurry includes constructing the feedwell to include a dilution channel positioned below the level of the supernatant liquid in the settling tank such that an amount of clarified liquor spills into the dilution channel and mixes with the influent stream of slurry. However, with conventional spill-over methods, it is often difficult to accurately control the dilution ratio. This becomes particularly important as the concentration of solids in the influent stream changes during the process and adjustments to the dilution ratio must be made.

Another more recent method of diluting the influent stream of slurry includes the use of an eductor to effect mixing of the diluent with the influent stream of slurry as well as to control the dilution ratio. Such a method is set forth in U.S. Pat. No. 5,643,463, issued Jul. 1, 1997 (to Wood et al.), the disclosure of which is incorporated by reference herein in its entirety. The Wood et al. patent discloses a self-diluting feedwell which includes an eductor structure. The eductor structure, described therein, generally includes a walled channel including a launder portion for receiving the influent stream of slurry, at least one port for introduction of a diluent therethrough, a narrow through portion to bring about eduction of the diluent into the feed stream, and a discharge portion from which the diluted influent slurry is introduced into the basin.

One problem associated with the dilution method and apparatus described in the Wood et al. patent is that classification of the solid particles or sanding may occur when the influent stream of slurry is introduced at low flow rates. When sanding occurs, particles begin settling prior to the slurry being introduced into the settling tank, causing buildup on the floor of the walled channel within the feedwell. This in turn affects the flow characteristics within the feedwell, making it difficult to obtain the desired mixing, flow and distribution of the slurry into the tank. Additionally, such sanding may affect the concentration of the solids of the slurry entering the tank since, at high flow rates, the built-up sludge at the bottom of the walled channel may become disturbed, with the attendant result of solids being reintroduced into the stream of slurry. In effect, the method and apparatus of the Wood et al. patent are limited in their ability to effectively provide dilution in low flow situations.

Thus, it would be advantageous to provide a method and apparatus for diluting an influent stream of slurry which provides effective control of the diluent ratio without the need for extraneous and expensive mechanical equipment and which are not limited by the flow rate of the influent stream of slurry.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
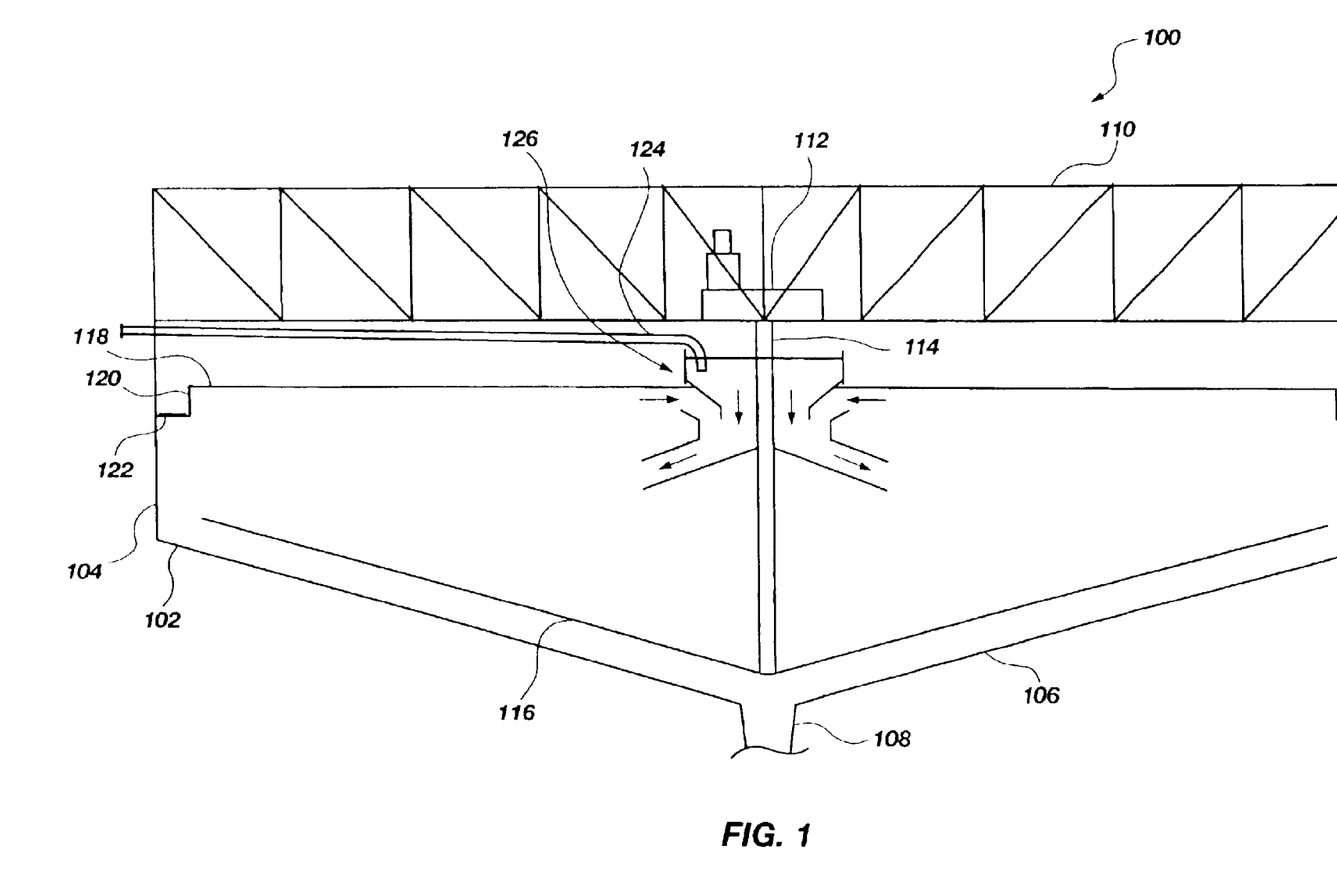
FIG. 1 is a sectional view of a sedimentation apparatus incorporating a diluting structure according to one embodiment of the present invention.

Referring to FIG. 1, an exemplary sedimentation apparatus 100 is shown which may be used, for example, as a clarifier or thickener. The sedimentation apparatus 100 includes a substantially circular tank 102 formed of one or more sidewalls 104 joined to a floor 106. The floor 106 generally slopes toward a discharge location 108 which is shown to be at the center of the tank 102, although other configurations may be possible.

Positioned above the tank 102 is a bridge 110 or other structural apparatus to which a drive 112 is mounted. The drive 112 is operably coupled to a rotatable column 114 which, in turn, is coupled to a set of rake arms 116 positioned adjacent the tank floor 106. The drive 112 may include a motor and a gear reducer appropriately sized and configured to provide the required torque for turning the rotatable column 114 and rake arms 116. The rake arms 116 rotate with and about the column 114 within the tank 102, causing sludge, or thickened mud, formed along the floor 106 of the tank 102 to move toward the discharge location 108 for collection and/or disposal thereof. The tank 102 further holds clarified liquor which, after reaching a specified liquid level 118 within the tank 102, spills over a weir or set of weirs 120 and into an adjacent collection trough 122. Slurry is provided to the tank 102 through an influent feed pipe 124 which discharges into a diluting structure 126.

It is noted that while the exemplary sedimentation apparatus 100 is depicted as a circular tank with a bridge-mounted column drive, various other tank and drive configurations may be utilized as will be apparent to and appreciated by one of ordinary skill in the art.

Figure 2:
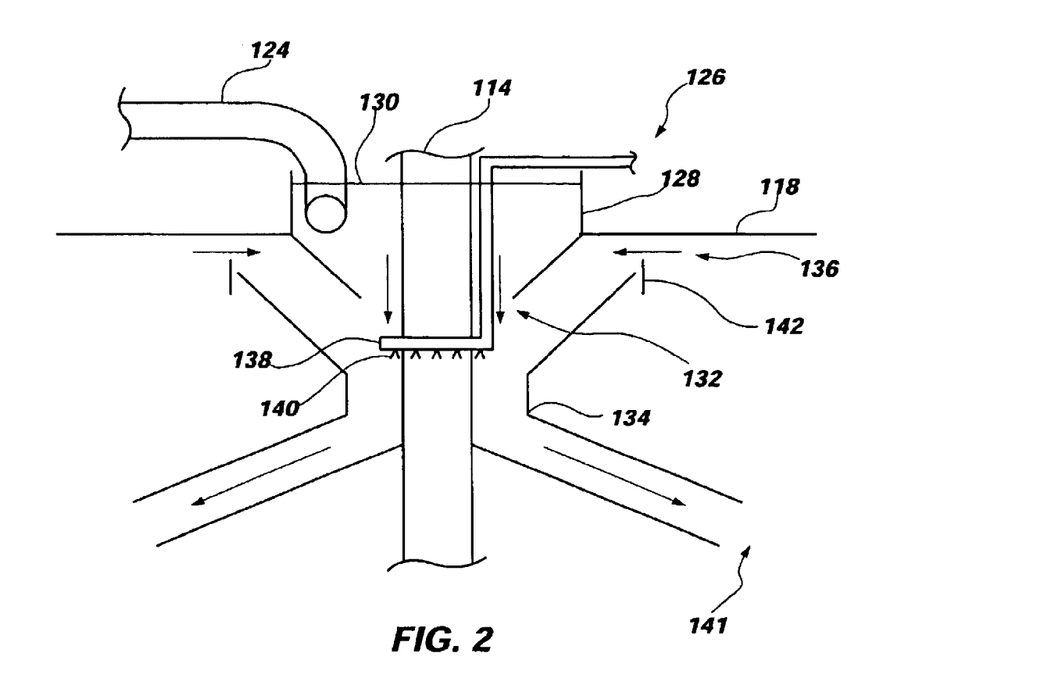
FIG. 2 is a sectional view of a dilution structure according to one embodiment of the present invention.

Referring now to FIG. 2, one embodiment of a diluting structure 126, also referred to herein as a feedwell, is shown in accordance with the present invention for use with the exemplary sedimentation apparatus 100. The feedwell 126 includes a launder 128 into which the influent feed pipe 124 discharges. The launder 128 includes an upper portion thereof positioned above the liquid level 118 of the tank 102. The liquid level 130 of the slurry in the launder 128 is also shown to be higher than the liquid level 118 of the clarified liquor in the tank 102. By maintaining the liquid level 130 at a relatively higher elevation within the launder 128, the slurry contained therein may be gravity fed through the feedwell 126 and into the tank 102 via the slurry's tendency to obtain an equilibrium with the liquid level 118 of the clarified liquor in the tank 102.

The launder 128 further includes a constricted discharge portion at its lower end which serves to create an eduction zone and which may be referred to as an eductor nozzle 132. The constricted flow of the slurry at the eductor nozzle 132 helps to maintain the slurry's liquid level 130 at a position higher than that of the clarified liquor's liquid level 118. The amount of liquid contained in the launder 128 provides a certain amount of pressure, or head, at the eductor nozzle 132 serving to increase the velocity of the slurry as it exits through the eductor nozzle 132, thus increasing its kinetic energy. As the influent slurry passes through the eductor nozzle 132, it creates a reduced pressure adjacent the discharge side of the eductor nozzle 132 via the acceleration of the influent slurry therethrough. The reduced pressure causes clarified liquor from tank 102 to be drawn into a mixing zone, such as within a mixing tube 134, through a diluent inlet 136 positioned adjacent the eductor nozzle 132 and effects a momentum transfer between the influent slurry and clarified liquor. The influent slurry is thus mixed with the clarified liquor to create a diluted slurry.

At this point, if so desired, a flocculating reagent may be added to the influent slurry via a flocculating header 138 having a plurality of nozzles 140 therein. The flocculating reagent may be dispensed via the nozzles 140 at a predetermined rate which may be correlated with, for example, the rate of flow of the influent slurry, the concentration of the slurry, and the type of flocculating reagent being utilized. Additionally, if so desired, the flocculating header 138 may be constructed such that it is adjustable with respect to its position within the flow of slurry leaving the eductor nozzle 132. Such adjustability may be effected both in terms of variation of distance from the eductor nozzle 132 and in terms of angle relative to the flow of the slurry exiting the eductor nozzle 132. The area in which the flocculating reagent is added to the influent slurry and/or the diluted slurry may also be referred to as a flocculating zone.

After the slurry has been diluted and flocculated, the diluted slurry passes through a discharge zone 141 of the feedwell 126 into the tank 102 for settling of the floc and clarifying of the liquor. The discharge zone 141 may be configured to divert the discharge of the diluted slurry such that it does not flow directly toward the bottom of the tank 102 or sedimentation apparatus 100 in which it is disposed. Such diversion of the discharged slurry helps to keep any sludge formed at the bottom of the sedimentation apparatus 100 from being resuspended within the clarified liquor. Thus, it may be desirable to configure the discharge zone 141 such that the discharged slurry exhibits a radially outward component as well as a downward component.

It is noted that the use of an eductor nozzle 132 with a diluent inlet 136 positioned adjacent thereto as described herein provides a low-shear environment in which the flocculant may be thoroughly mixed with the slurry with minimal floc breakup. Reducing floc breakup greatly enhances the sedimentation process as the solid particles contained in the slurry settle more expeditiously when formed as a floc.

The vertical nature of the eductor nozzle 132 positioned in the feedwell 126 provides various advantages over the use of more conventional dilution techniques such as, for example, the use of a horizontally disposed eductor nozzle. One advantage includes the marked reduction in sanding at low flow rates. By controlling the flow such that it has a continual vertical component associated with it, the solid particles and/or floc have substantially no opportunity to settle within the feedwell 126 but instead settle along the floor 106 of the tank 102 as is intended. By substantially eliminating the possibility of sanding within the feedwell 126, the influent slurry may be fed into the tank 102 via the feedwell 126 at very low flow rates and the diluent ratio may be infinitely adjusted for different types and concentrations of influent slurries.

Additionally, the arrangement described with respect to FIG. 2 provides the advantages of requiring a smaller overall volume feedwell 126 while also providing an increased mixing tube 134 area over conventional feedwells using eductor-type configurations. The reduced size of the feedwell 126 allows for the use of fewer materials in its construction and additionally provides for greater flexibility in the customization and design of the overall sedimentation apparatus 100. The increased mixing tube 134 area, relative to conventional eductor-type configurations, provides a decrease in shear and velocity of the slurry as it passes therethrough which, as mentioned above, allows for flocculating and mixing to occur without substantial breakup of the floc.

Control of the dilution ratio may be accomplished in any of a number of ways with the present invention. One manner of controlling the dilution ratio is to control the flow rate of the influent slurry as it exits the influent feed pipe 124. Controlling the flow rate of the influent slurry will help to determine the liquid level 130 of the influent slurry. A greater difference between the liquid level 130 of the slurry and the liquid level 118 of the clarified liquor provides greater pressure or head at the eductor nozzle 132, thus increasing the velocity of influent slurry as it passes through the eductor nozzle 132. Similarly, a decreased differential between the two liquid levels 118 and 130 results in a decreased influent slurry velocity at eductor nozzle 132. An increase or decrease in the head, with a resulting increase or decrease of slurry velocity through the eductor nozzle 132, results in a greater or lesser amount of diluent being drawn through the diluent inlet 136 respectively. slurry velocity through the eductor nozzle 132 results in a greater or lesser amount of diluent being drawn through the diluent inlet 136 respectively.

Therefore, controlling the influent flow rate controls the differential between the liquid levels 118 and 130; controlling the differential of the liquid levels 118 and 130 controls the head and velocity of the slurry at the eductor nozzle 132; and controlling the head and velocity of the slurry at the eductor nozzle 132 controls the ratio of diluent being mixed therewith.

Alternatively, mechanical devices may be utilized to help control the diluent ratio. For example, a vertically adjustable baffle 142 may be installed at the diluent inlet 136 to either enlarge or reduce the size of the opening at the diluent inlet 136 such that a greater or lesser amount of clarified liquor from tank 102 may be allowed to pass therethrough. Alternatively, while perhaps more mechanically complex, the entire lower portion of the feedwell 126, including the mixing tube 134 and the discharge zone 141, may be made to be adjustable relative to the upper portion of the feedwell 126 including the launder 128 and the eductor nozzle 132. For example, the lower portion of the feedwell 126 may be attached to the column 114, which, as will be appreciated by those of ordinary skill in the art, may be adjusted vertically for positioning the rake arms 116 (FIG. 1) relative to the floor 106 of the tank 102. By raising the lower portion of the feedwell 126, less clarified liquor would be able to pass through the diluent inlet 136 and vice versa.

It is noted that the launder 128, and more generally the feedwell 126, may be formed as a substantially annular-type member circumscribing the column 114 such that the column 114 passes through the slurry contained by the launder 128. For example, the launder 128 may be formed as a cylinder with the eductor nozzle 132 being shaped as a shell of an inverted-truncated-cone coupled to the bottom of the launder 128 with both the launder 128 and eductor nozzle 132 circumscribing the column 114. Alternatively, the launder 128 may be constructed to feed a plurality of individual eductor nozzles 132 spaced and arranged in a defined pattern to distribute the slurry therefrom.

Similarly, depending on the construction of the eductor nozzles 132, the mixing tube 134 may be formed as a substantially annular member, or as a plurality of individual mixing tubes 134 configured to receive slurry from the individual eductor nozzles 132, as the case may be.

Figure 3:
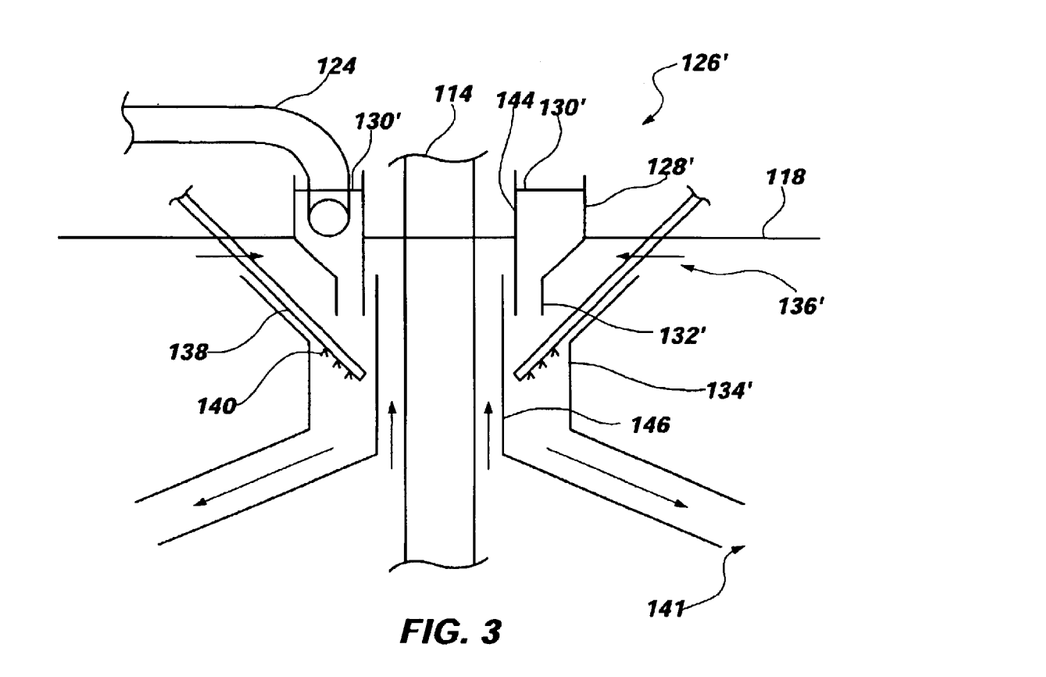
FIG. 3 is a sectional view of a dilution structure according to another embodiment of the present invention.

Referring to FIG. 3, another embodiment of a feedwell 126' according to the present invention is shown. The feedwell 126' includes components similar to the feedwell 126 described with respect to FIG. 2, with modifications in the launder 128', eductor nozzle 132' and mixing tube 134'. Particularly, the launder 128' includes an interior wall 144 such that both the launder 128' and the eductor nozzle 132' are each substantially configured as an annulus surrounding the column 114 such that the column 114 does not penetrate through the slurry. Additionally, the mixing tube 134' includes an interior wall 146 which is laterally spaced from the column 114 such that the mixing tube 134' is likewise substantially configured as an annulus surrounding the column 114. The interior wall 146 terminates at an upper end slightly above the outlet of the eductor nozzle 132' but is laterally spaced therefrom. Such a design allows the clarified liquor to be drawn upwards between the column 114 and the interior wall 146 of the mixing tube 134' and into the mixing tube 134' by virtue of the reduced pressure area created by the eductor nozzle 132', resulting in increased mixing of the clarified liquor with the slurry as the slurry exits the eductor nozzle 132' adjacent the diluent inlet 136'.

Figure 4:
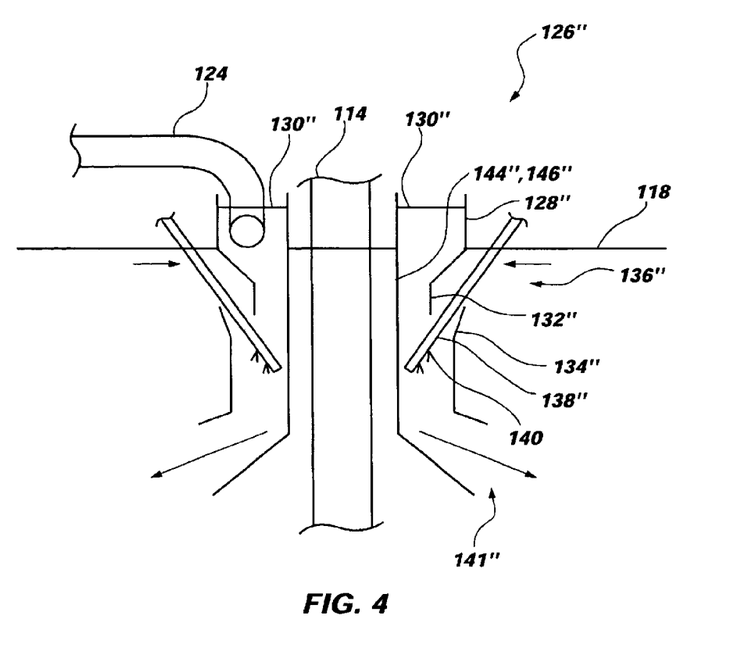
FIG. 4 is a sectional view of a dilution structure according to another embodiment of the present invention.

Referring to FIG. 4, another embodiment of a feedwell 126" according to the present invention is shown. The feedwell 126" includes a launder 128" similar to that which is shown and described with respect to FIG. 3 and a diluent inlet 136" Particularly, the launder 128" includes an interior wall 144" separating the slurry from the column 114. However, the interior wall 144" of the launder 128" extends further downward and serves as the interior wall 146" of the mixing tube 134" as well. Thus, the launder 128", eductor nozzle 132" and the mixing tube 134" are each substantially configured as an annulus with a common interior wall 144", 146". It is additionally noted that the end of the mixing tube 134" adjacent the discharge zone 141" includes an expanded cross-section. Such a design allows for additional reduction in velocity and pressure of the diluted slurry/floc as it exits from mixing tube 134" into the tank 102.

It is noted that while certain embodiments have been described as being substantially configured as an annulus, such a description should not be considered as being limited to a circular structure. Rather, the geometric configuration may include other shapes such as, for example, oval, elliptical, square, or rectangular configurations which exhibit mutually independent internal and external peripheries.

Figure 5A:
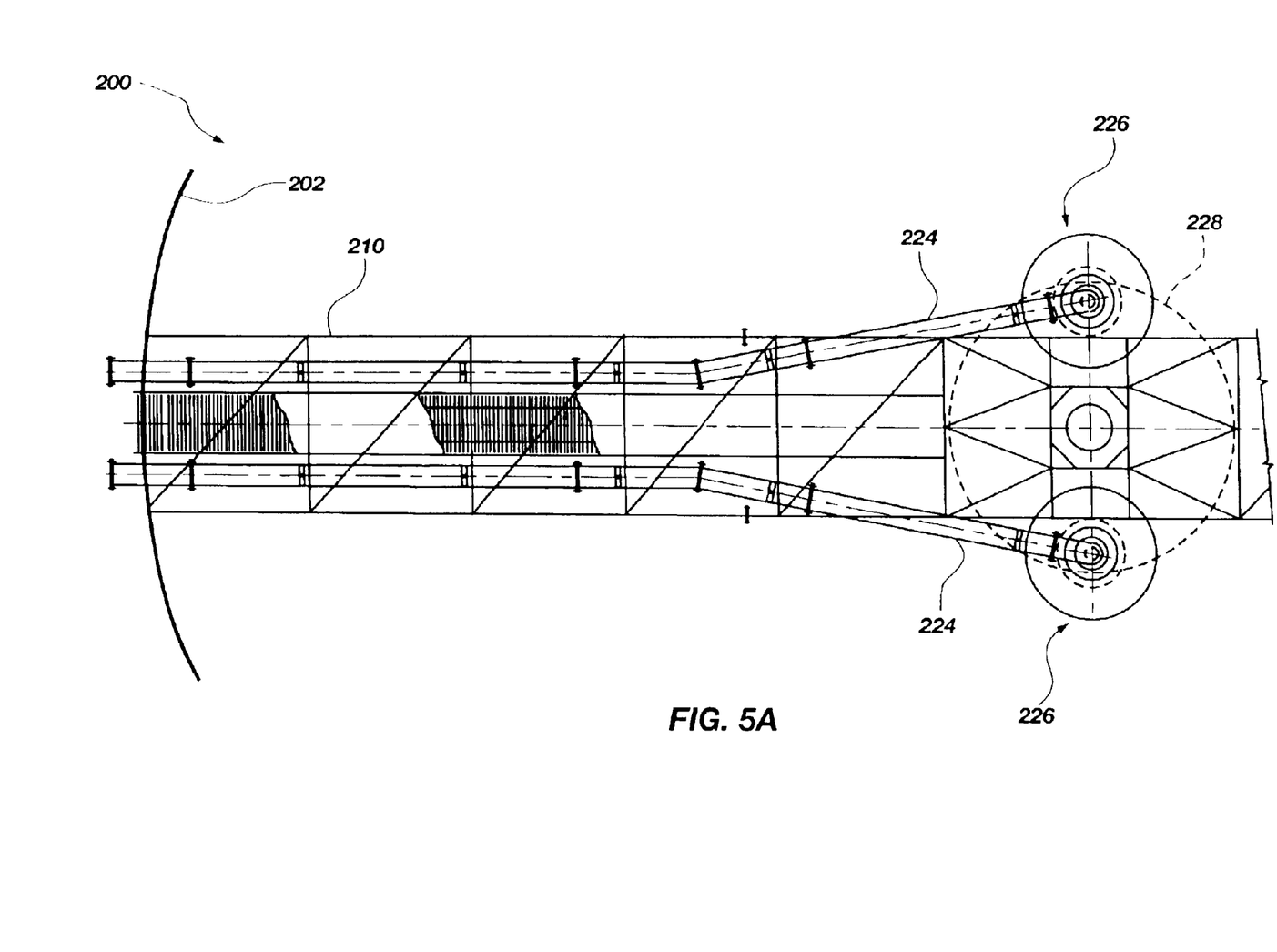
FIG. 5A is a plan view showing multiple dilution structures installed in a sedimentation apparatus according to yet another embodiment of the present invention.

Referring to FIG. 5A, multiple diluting structures 226 are shown to be installed in a sedimentation apparatus 200 which includes a tank 202, a bridge 210 or other structural support, and associated components such as described above with regard to other embodiments of the invention. The diluting structures 226 are shown to be positioned within the tank 202 at a location which corresponds generally to the diameter of a feedwell 228 (shown in dashed lines). It is noted that the diluting structures 226 may be positioned at other locations within the tank 202, but that the configuration shown in FIG. 5A allows for replacement of a more conventional influent feed apparatus with the diluting structures of 226 of the present invention. Such a configuration allows for an existing sedimentation apparatus to be more easily retrofitted or converted with the installation of the diluting structures 226 of the present invention.

Figure 5B:
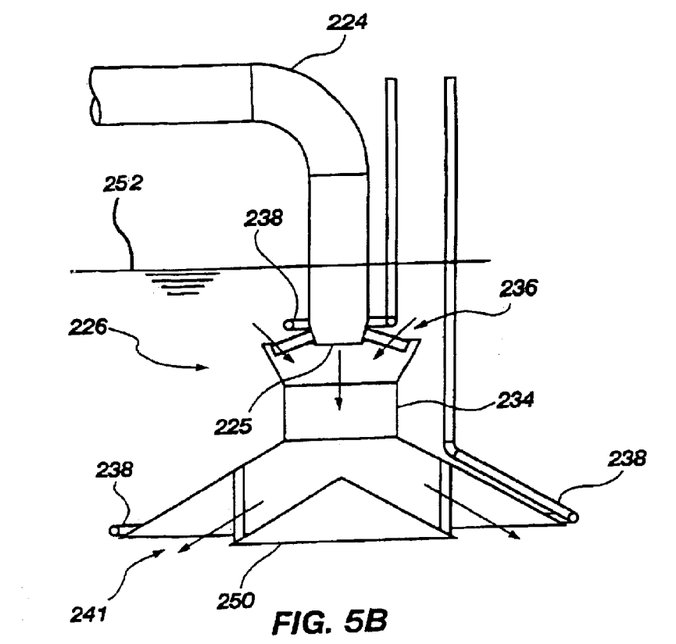
FIG. 5B is a sectional view of one of the dilution structures shown in FIG. 5A.
Figure 5C:
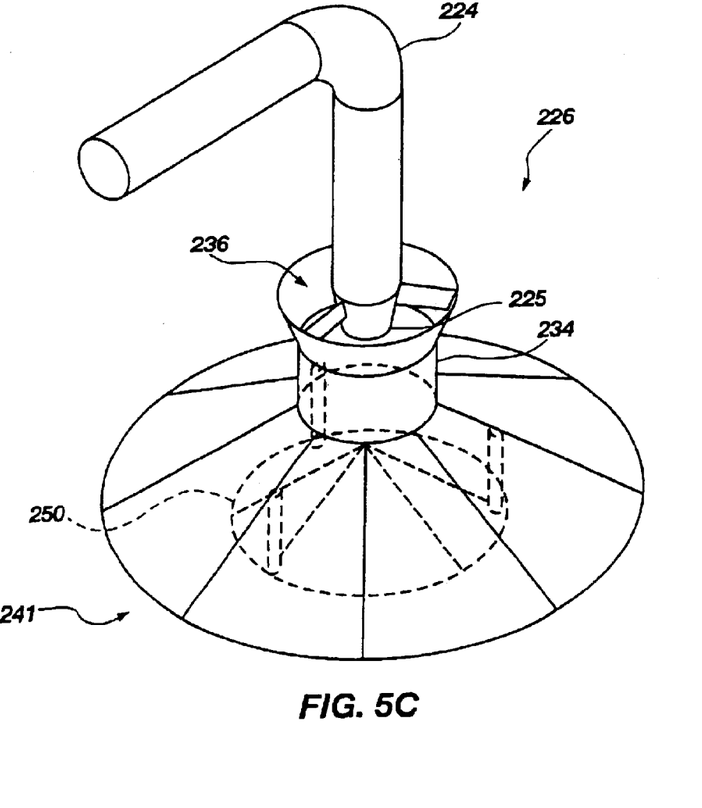
FIG. 5C is a perspective view of one of the dilution structures shown in the embodiment of FIG. 5A.

Referring now to FIGS. 5B and 5C (while still referring generally to FIG. 5A), sectional and perspective views, respectively, of the diluting structure 226 are shown. The diluting structure 226 includes a feed pipe 224 which may include a constricted feed pipe outlet 225 or nozzle to introduce slurry into the diluting structure 226. The feed pipe outlet 225 is positioned to discharge the slurry at a location proximate to a diluent inlet 236. Thus, for example, as shown in FIG. 5B, the feed pipe outlet 225 may be positioned such that it lies substantially along the same plane as the diluent inlet 236. The diluent inlet 236 is generally configured to exhibit a greater cross-sectional area than the feed pipe outlet 225 and may exhibit a frustoconical geometry such as shown, although other geometries may be utilized.

The influent slurry exiting the feed pipe outlet 225 serves to draw clarified liquor to enter into the diluting structure 226 via the diluent inlet 236 in a manner similar to that described above with respect to other embodiments of the invention. Both the influent slurry and the clarified liquor then enter a mixing zone, which may comprise a mixing tube 234 wherein the diluent and influent slurry mix to form a diluted slurry. The mixed, diluted slurry then exits the diluting structure 226 via a discharge zone 241 and flows into a sedimentation apparatus. A diverter 250 may be positioned in the discharge zone 241 so as to impart a radial component to the exiting diluted slurry, thereby keeping the diluted slurry from jetting into the floor or bottom of an associated sedimentation apparatus positioned beneath the diluting structure 226. Flocculating headers 238 may be positioned adjacent the diluent inlet 236 and/or the discharge zone 241 for introduction of a flocculating reagent.

It is noted that the diluting structure 226 of the embodiment depicted in FIGS. 5A through 5C is positioned entirely beneath the liquid level 252, or, in other words, is submerged in the liquor. Such a configuration allows the present invention to be installed in a sedimentation apparatus without a feedwell associated therewith as previously discussed with respect to FIG. 5A. Also, as discussed with respect to FIG. 5A, such a configuration allows for easier installation of a diluting structure according to the present invention in an existing sedimentation apparatus.

Additionally, the diluting structure 226 shown in FIGS. 5A through 5C is more flexible in its installation, particularly with regard to locating the diluting structure 226 within a sedimentation apparatus 200. Also, the configuration of the diluting structure 226 is more conducive to installing multiple diluting structures 226 in a single sedimentation apparatus 200 such as is shown in FIG. 5A. The ability to provide multiple diluting structures 226 and the flexibility in the placement of the diluting structures 226 within a sedimentation apparatus 200 allows for much greater control of the mixing of the slurry and ultimately the sedimentation of the sludge.

While the invention may be susceptible to various modifications and alternative forms, specific embodiments have been shown by way of example in the drawings and have been described in detail herein. However, it should be understood that the invention is not intended to be limited to the particular forms disclosed. Rather, this invention includes modifications, equivalents, and alternatives falling within the spirit and scope of the invention as defined by the following appended claims.

What is claimed is:

1. A diluting structure for a sedimentation apparatus configured to contain a level of liquid therein having an intended liquid level, the diluting structure comprising:
    an influent slurry feed pipe including an eductor nozzle outlet disposed below the intended liquid level to direct a flow of influent slurry from the feed pipe;
    an eduction zone adjacent the eductor nozzle outlet and configured to convey the directed flow of the influent slurry discharged from the eductor nozzle therethrough;
    a diluent inlet positioned at least partially below the intended liquid level and proximate the eduction zone such that the flow of influent slurry conveyed through the eduction zone draws liquid therethrough;
    a mixing zone positioned below the intended liquid level and configured to receive the liquid and the influent slurry to create a diluted slurry; and
    a discharge zone positioned below the intended liquid level and configured to discharge the diluted slurry into the sedimentation apparatus such that the discharged, diluted slurry exhibits a downward component and a radially outward component of flow with respect to the diluting structure.

2. The diluting structure of claim 1, further comprising a first flocculating zone positioned proximate the eduction zone.

3. The diluting structure of claim 2, further comprising a second flocculating zone positioned proximate the discharge zone.

4. The diluting structure of claim 1, further comprising a first flocculation zone positioned proximate the discharge zone.

5. The diluting structure of claim 1, wherein the eductor nozzle is oriented and configured to direct fluid flow vertically therefrom.

6. The diluting structure of claim 1, further comprising an adjustable baffle adjacent the diluent inlet for controlling the amount of liquid drawn therethrough.

7. The diluting structure of claim 1, wherein the eductor nozzle in substantially configured as an annulus.

8. The diluting structure of claim 1, wherein the diluting structure is operably associated with the sedimentation apparatus, the sedimentation apparatus comprising a tank having an interior portion bounded by at least one wall and a floor, and wherein the eduction zone, the diluent inlet, the mixing zone and the discharge zone are each positioned within the interior portion of the tank.

9. The diluting structure of claim 8, wherein the sedimentation apparatus further comprises at least one rake arm disposed within the tank below the discharge zone.

10. The diluting structure of claim 9, wherein the sedimentation apparatus further comprises a drive operably coupled to the at least one rake arm and configured to motivate the at least one rake arm adjacent the floor of the tank.

11. The diluting structure of claim 1, wherein the eductor nozzle outlet includes a constricted outlet.

12. A diluting structure for a sedimentation apparatus configured to contain a level of liquid therein having an intended liquid level, the diluting structure comprising:
- an influent slurry launder having an upper portion positioned above the intended liquid level and a lower portion positioned below the intended liquid level, the lower portion comprising an eductor nozzle; an eduction zone proximate the eductor nozzle and configured to convey an influent slurry therethrough;
- a diluent inlet positioned at least partially below the intended liquid level and proximate the eduction zone such that the influent slurry conveyed through the eduction zone draws an amount of liquid therethrough;
- a mixing zone positioned below the intended liquid level and configured to receive the amount of liquid and the influent slurry to create a diluted slurry; and
- a discharge zone positioned below the intended liquid level and configured to discharge the diluted slurry into the sedimentation apparatus such that the discharged, diluted slurry exhibits a downward component and a radially outward component of flow with respect to the diluting structure.

13. The diluting structure of claim 12, wherein the launder is substantially configured as an annulus.

14. The diluting structure of claim 13, wherein the mixing zone includes a mixing tube substantially configured as an annulus.

15. The diluting structure of claim 14, wherein the launder and the mixing tube include a common interior wall.

* * * * *